(No Model.)
H. F. GARDNER & F. J. BENSCOTER.
LOCK NUT.
No. 603,683.      Patented May 10, 1898.
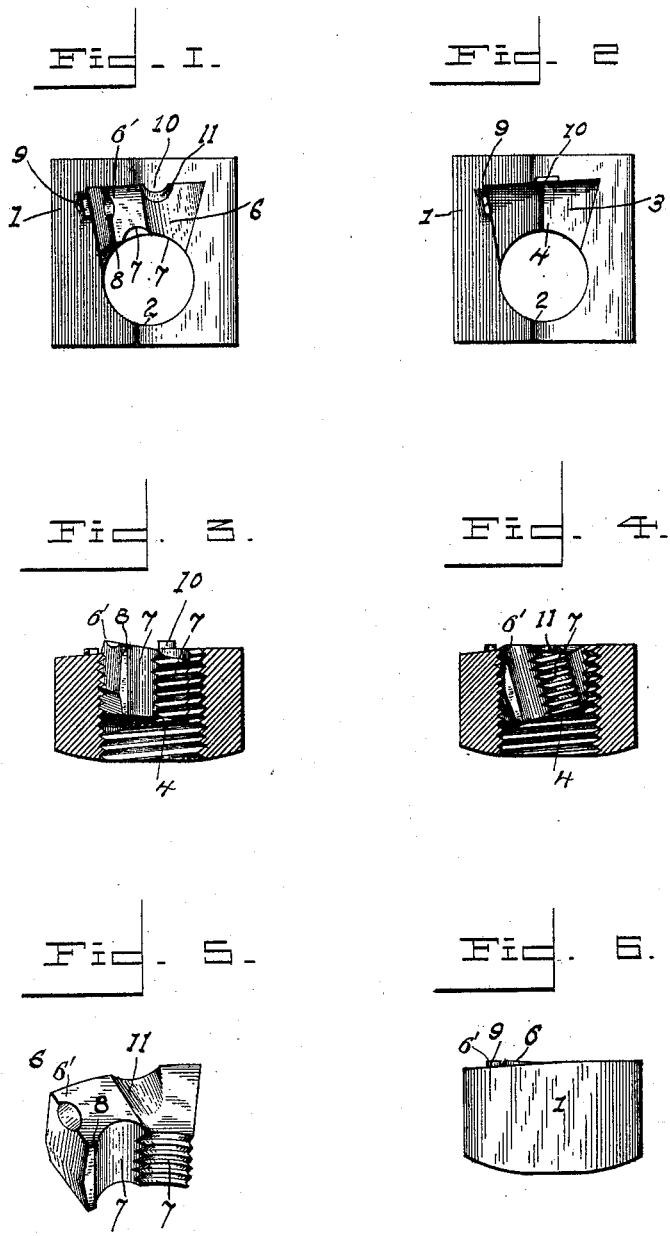
Witnesses:
Fenton S. Pelt,
J. A. Willson.
Inventors:
H. F. Gardner,
Frank J. Benscoter,
by H. B. Willson & Co.
Attorneys

UNITED STATES PATENT OFFICE.

HARRY F. GARDNER AND FRANK J. BENSCOTER, OF MACKSVILLE, KANSAS.

LOCK-NUT.

SPECIFICATION forming part of Letters Patent No. 603,683, dated May 10, 1898.

Application filed September 16, 1897. Serial No. 651,870. (No model.)

*To all whom it may concern:*

Be it known that we, HARRY F. GARDNER and FRANK J. BENSCOTER, citizens of the United States, residing at Macksville, in the county of Stafford and State of Kansas, have invented certain new and useful Improvements in Lock-Nuts; and we do declare the following to be a full, clear, and exact description of the invention, such as will enable others skilled in the art to which it appertains to make and use the same.

Our invention has relation to lock-nuts; and the object is to provide a nut of this character that will automatically and effectually lock itself when screwed home in place; and to this end the invention consists in certain features of construction and combination of parts, which will be hereinafter fully described and claimed.

In the accompanying drawings, Figure 1 is a plan view of a nut from its base embodying our invention. Fig. 2 is a similar view with the lock removed. Fig. 3 is a transverse sectional view of the lock in place, showing it before it has been tilted to bind the bolt. Fig. 4 is a view showing it tilted to bind the bolt. Fig. 5 is a detail perspective view of the lock removed, and Fig. 6 is a side view of the nut with the lock in place.

In said drawings, 1 denotes a nut provided with a screw-threaded bolt-aperture 2, intersected by a deep recess 3, the closed end of which is raised at its center, as shown at 4, to form a fulcrum-bearing for the lock.

The lock consists of a block 6, which rests upon the fulcrum-point and is provided with an extension 6'. The inner face of this lock is provided with a series of threads 7, which when the lock is in the position shown in Fig. 3 form a partial continuation of the threads of the nut opposite the recess. To one side of these threads of the lock is a curved recess 7 and a plain portion 8.

The parts being in the position shown in Fig. 3, the nut is screwed upon the bolt, and when the extension of the lock comes in contact with the solid body against which the nut is screwed it will be pressed outward toward the top of the nut, rocking the lock upon its fulcrum-point, and thus changing the threads on the lock from right to left hand threads, preventing removal of the nut without destroying the threads of the bolt.

The nut on its base is beveled to leave a short stud 9 to be pressed down on the lock when it is forced against a solid surface, thus holding it in place in case of shrinkage. However, this will not prevent the nut from being retightened.

10 denotes a stud which is integral with the the nut and which is adapted to be bent down over the lock in the recess 11, so that the lock and nut will not become separated in shipping or handling.

From the foregoing description, taken in connection with the accompanying drawings, the operation and advantages of the invention will be readily understood without requiring an extended explanation.

It will be observed that a lock-nut thus constructed comprises but two parts—namely, the nut and the lock—and owing to the simplicity of construction the device may be made at small cost.

Although we have specifically described the construction and relative arrangement of the invention, we do not desire to be confined thereto, as such changes or modifications may be made as clearly fall within the scope of our invention without departing from the spirit thereof.

Having thus described our invention, what we claim, and desire to secure by Letters Patent, is—

1. An automatic lock-nut, comprising the nut proper, provided with a recess having a fulcrum-point, a lock seated in said recess upon said fulcrum-point, and having an extension that projects beyond the base of the nut and threads which form a continuation of the threads of the nut, whereby when the nut is screwed home, the lock will be rocked upon its fulcrum-point, thus clamping the threads of the bolt to which the nut is applied, substantially as set forth.

2. An automatic lock-nut, comprising the nut proper provided with a recess, the end wall of which is provided with a fulcrum-point intermediate the breadth of the recess, a lock seated in said recess and provided with an extension that normally projects beyond the base of the nut, and provided with threads that form a continuation of the threads of the nut, and with a recess at one side of the threads, a lip for permanently holding the lock in said recess, and a lip to be bent down over the lock when screwed up against a solid object, substantially as set forth.

In testimony whereof we hereunto affix our signatures in presence of two witnesses.

HARRY F. GARDNER.
    FRANK J. BENSCOTER.

Witnesses:
    JAMES BUDGE,
    E. T. SWEENEY.